US008793529B2

(12) United States Patent
Lee

(10) Patent No.: US 8,793,529 B2
(45) Date of Patent: Jul. 29, 2014

(54) CONGESTION CONTROL METHOD FOR SESSION BASED NETWORK TRAFFIC

(75) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 460 days.

(21) Appl. No.: 12/264,763

(22) Filed: Nov. 4, 2008

(65) Prior Publication Data

US 2010/0115327 A1 May 6, 2010

(51) Int. Cl.
| | | |
|---|---|---|
| G06F 11/00 | (2006.01) | |
| G06F 11/16 | (2006.01) | |
| G06F 11/20 | (2006.01) | |
| G06F 15/173 | (2006.01) | |

(52) U.S. Cl.
CPC ........ G06F 11/2035 (2013.01); G06F 11/2038 (2013.01)
USPC .......... 714/4.12; 714/4.1; 714/4.11; 709/223; 709/224; 718/1; 718/105

(58) Field of Classification Search
CPC ............. G06F 11/2023–11/2046; H04L 29/14
USPC ......... 709/203, 219, 223–226, 227, 244, 248; 714/4, 10–13, 4.1, 4.11, 4.12; 718/1, 718/105
See application file for complete search history.

(56) References Cited

U.S. PATENT DOCUMENTS

| | | | |
|---|---|---|---|
| 6,134,596 A * | 10/2000 | Bolosky et al. ............... | 709/233 |
| 6,446,218 B1 * | 9/2002 | D'Souza ......................... | 714/4.4 |
| 6,578,066 B1 * | 6/2003 | Logan et al. .................. | 718/105 |
| 6,862,623 B1 * | 3/2005 | Odhner et al. ................ | 709/226 |
| 7,062,556 B1 * | 6/2006 | Chen et al. .................... | 709/226 |
| 7,103,595 B2 * | 9/2006 | Anastasiadis et al. ................ | 1/1 |
| 7,249,179 B1 * | 7/2007 | Romero et al. ............... | 709/226 |
| 7,469,279 B1 * | 12/2008 | Stamler et al. ................ | 709/221 |
| 7,478,149 B2 * | 1/2009 | Joshi et al. .................... | 709/223 |
| 7,685,465 B1 * | 3/2010 | Shaw et al. ..................... | 714/15 |
| 8,554,981 B2 * | 10/2013 | Schmidt et al. .................... | 711/6 |
| 2006/0031287 A1 * | 2/2006 | Ulrich et al. .................. | 709/203 |
| 2007/0233843 A1 * | 10/2007 | Frey-Ganzel et al. ........ | 709/223 |
| 2007/0276933 A1 * | 11/2007 | Lee et al. ....................... | 709/223 |
| 2008/0189468 A1 * | 8/2008 | Schmidt et al. .................... | 711/6 |
| 2008/0189700 A1 * | 8/2008 | Schmidt et al. .................... | 718/1 |
| 2010/0115327 A1 * | 5/2010 | Lee .................................. | 714/4 |
| 2014/0040896 A1 * | 2/2014 | Schmidt et al. .................... | 718/1 |

OTHER PUBLICATIONS

VMware Best Practices "VMware Infrastructure Resource Management with VMware DRS", 24 pages, © 1998-2006 VMware, Inc. Palo Alto, CA, 24 pages.*

Rajagopal, S., "PAC177 Distributed Availability Service (DAS) Architecture," Presentation Oct. 2005, VMworld2005 Virtualize Now, Las Vegas, Oct. 18-20, 2005, © 2005 VMware, Inc. Palo Alto, CA, 41 pages.*

* cited by examiner

*Primary Examiner* — Gregory Todd

(57) ABSTRACT

A method includes establishing an expected traffic load for a plurality of servers, wherein each server has a respective actual capacity. The method further includes limiting the actual capacity of each server to respective available capacities, wherein a combined available capacity that is based on the available capacities corresponds to the expected traffic load. The method also includes dynamically altering the respective available capacity of the servers based on the failure of at least one server.

20 Claims, 5 Drawing Sheets

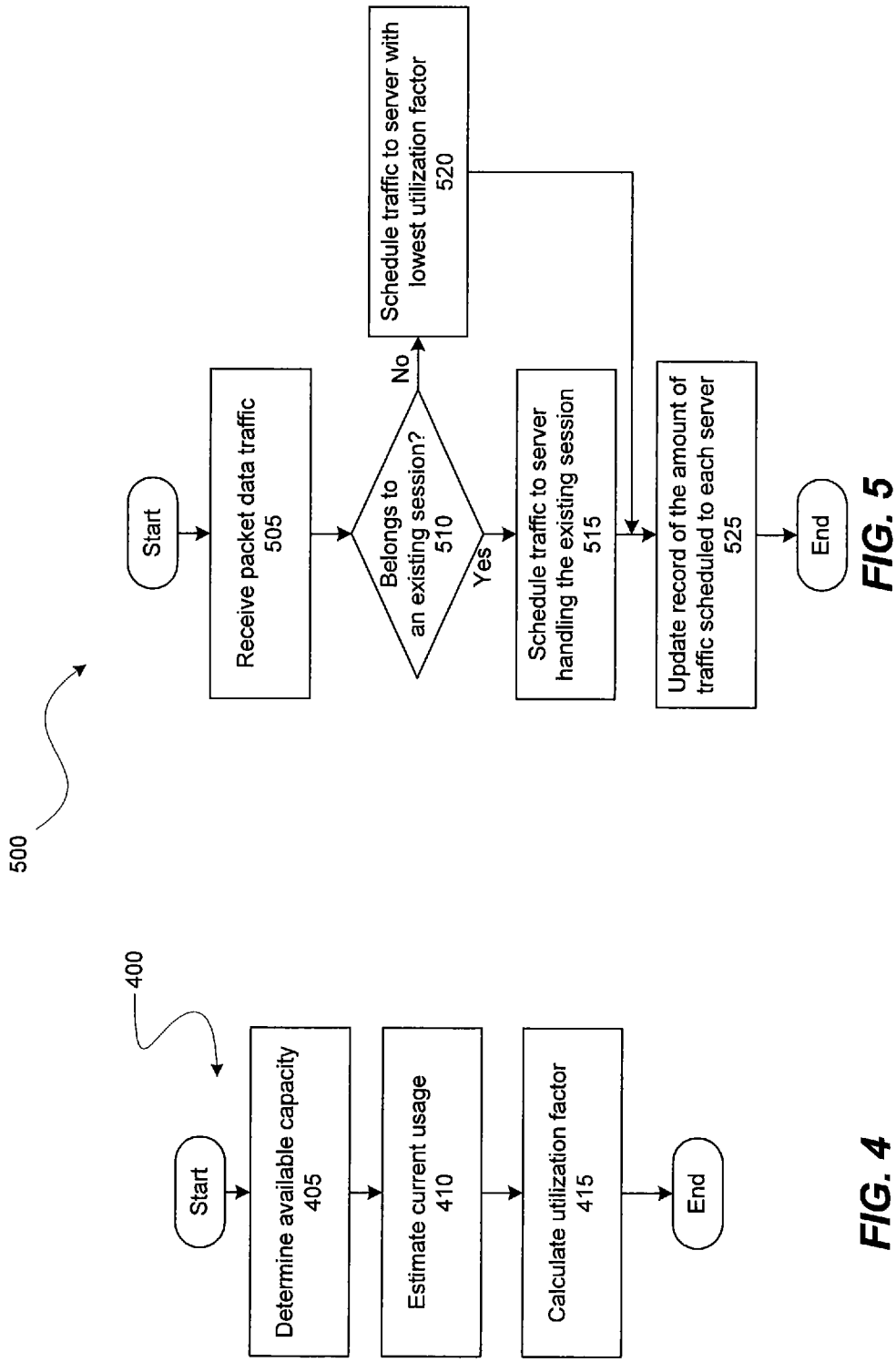

CONGESTION CONTROL METHOD FOR SESSION BASED NETWORK TRAFFIC

BACKGROUND

As Internet Protocol (IP)-based networks are increasingly deployed, packet-based applications such as voice over IP (VoIP), IP video, video telephony (VT), integrated voice and email, and instant messaging (IM), have emerged. The ability to integrate these services over the same network has become more important as customers appreciate and demand the bundling of multiple services. Many of these services benefit from session based connections between communicating network devices. For example, rather than having each data transmission between two devices be considered independent from each other, a series of data transmissions may be logically grouped together as a session. As session based traffic increases in the network, the problems of how to provide redundancy and load balancing among a cluster of session handling servers have to be addressed.

BRIEF DESCRIPTION OF THE DRAWINGS

FIG. 4 is a flowchart depicting exemplary steps and decisions related to a process for updating server utilization factors; and FIG. 5 is a flowchart depicting exemplary steps and decisions related to a process for scheduling packet data traffic to servers in the cluster.

DETAILED DESCRIPTION

Figure 1A:
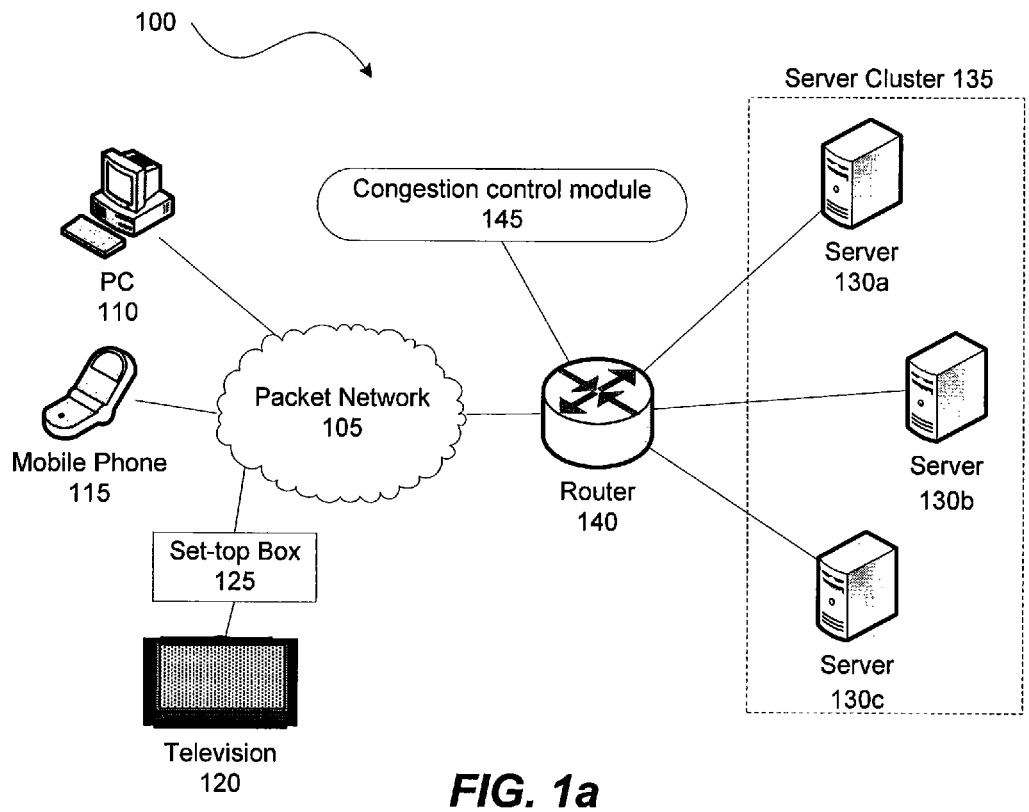
FIG. 1a is a diagram of an exemplary system for implementing a congestion control method.

Exemplary illustrations of a congestion control method for session based network traffic are described below. In the interest of clarity, not all features of an actual implementation are described in this specification. It will of course be appreciated that in the development of any such actual illustration, numerous implementation-specific decisions must be made to achieve the specific goals of the developer, such as compliance with system-related and business-related constraints that will vary from one implementation to another. Moreover, it will be appreciated that such a development effort might be complex and time-consuming, but would nevertheless be a routine undertaking for those having the benefit of this disclosure.

Referring now to the drawings wherein like numerals indicate like or corresponding parts throughout the several views, exemplary illustrations are provided.

FIG. 1a illustrates a system 100 for use with a congestion control method for session based network traffic. Details of the elements depicted in the figures are included following a brief functional overview of the system 100 and method. Packetized data on a packet data network 105 may be transmitted to and from any of a number of interconnected network devices. For example, end user devices such as a Personal Computer (PC) 110, a mobile phone 115, a television 120 via a set-top-box 125, etc., may be the recipient or initiator of data traffic over the packet network 105. Servers 130a-c may receive and process data traffic from the end user devices. Moreover, the servers 130a-c may provide responsive data traffic to the end user devices. When multiple servers 130a-c collectively handle the same type of requests and data traffic, they may be arranged into a cluster 135.

When arranged as the cluster 135, additional measures may need to be implemented to ensure that the servers 130 are utilized in a suitable manner. For example, it may be desirable to have similarly situated servers 130 handle corresponding amounts of data. Accordingly, a load-balancing scheme may be implemented to assign certain amounts of data processing to particular servers 130 of the cluster. Additionally, certain amounts of the data processing capacities of the servers 130 may need to be reserved for redundancy. A redundancy scheme may allow the cluster 135 to maintain normal operations even with a failure of one of the servers 130.

By focusing on the capacity of each server to process data as well as on the amount of data actually processed by each server 130, a single cluster manager may be able to implement both redundancy planning and load-balancing schemes. A router 140, or any other network device acting as the cluster manager, may have the responsibility of tracking the amount of data actually processed by each server 130 and scheduling new data traffic to a particular server. Accordingly, the router 140 may provide a congestion control module 145 to implement the redundancy planning and load-balancing schemes.

The packet network 105 may be a packet switched communication network such as an Internet Protocol (IP) network. The packet network 105 generally interconnects various computing devices and the like through a common communication protocol, e.g. the Internet Protocol. Interconnections in and with the packet network 105 may be made by various media including wires, radio frequency transmissions, and optical cables. Other devices connecting to and included with the packet network 105, e.g., switches, routers, etc., are omitted for simplicity of illustration in FIG. 1. The packet network 105 may interface with an IP Multimedia Subsystem (IMS), which integrates voice, video, and data communications on the same network infrastructure.

The PC 110, mobile phone 115, and television 120 by way of a set-top-box 125 merely represent three of many possible network devices capable of connecting to the cluster 135 for session based data processing. Each of these devices has computer software including an implementation of the network protocol needed to communicate over the packet network 105. Additionally, the devices may also implement higher level protocols to interface with the session handling facilities of the servers 130. For example, the mobile phone 115 may include instructions for conducting a voice communication based session over the packet network 105. Likewise, the set-top-box 125 may include instructions for conducting a video based session over the packet network 105.

The servers 130 of the cluster 135 generally provide session handling capabilities. For example, they may be able to initiate a session based on a request from one of the network devices 110, 115, 125, etc., process data during the session, and terminate the session as necessary. Session Initiation Protocol (SIP) is a signaling protocol for initiating, managing and terminating application sessions in IP networks, and provides a mechanism to allow voice, video, and data to be integrated over the same network. Accordingly, the servers 130 may implement SIP for session handling.

The router 140 may interconnect one or more computing devices, e.g., servers 130, to the packet network 105. Moreover, the router 108 may establish and operate a local area network (LAN) for the servers 130, and may route certain communications thereof. For example the computing devices 110 may be connected to the router 108 using a wireless connection, a network cable such as a "Cat5" cable, or the like.

The router 140 may further act as the cluster manager of the cluster 135. The cluster manager may be an upstream network device to the cluster 135 such as a device positioned between the cluster and the packet network 105. However, in another exemplary approach, one of the servers, e.g., 130a, may be designated as the cluster manager. In such an approach, the designated server 130a may be considered upstream in that it acts as a gateway of the cluster 135 for incoming network traffic.

The congestion control module 145 may include computer instructions for implementing redundancy and load balancing schemes. The congestion control module will be provided by the device acting as the cluster manager, e.g., the router 140 as depicted in the exemplary approach of FIG. 1. As will be discussed in detail below, the congestion control module 145 may continuously schedule incoming traffic to particular servers 130, calculate utilization rates of the servers, monitor the cluster 135 for server failures, and update redundancy factors based on the state of the cluster. Positioning the congestion control module 145 upstream from the servers 130 may allow for the estimation of current utilization rates of the servers. Estimating utilization rates by the congestion control module 145 may eliminate time consuming bi-direction communication between the servers 130 and router 140 to determine the actual current utilization rates.

Figure 1B:
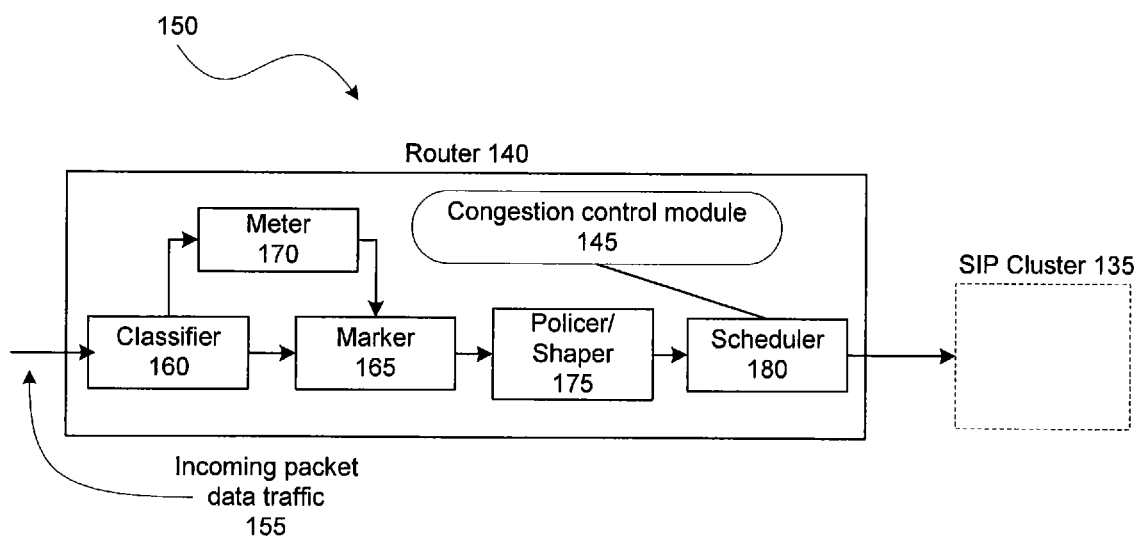
FIG. 1b is a system diagram of an exemplary upstream network device.

FIG. 1b illustrates the elements of an exemplary upstream network device, such as the router 140. As illustrated, the router 140 may include elements for guaranteeing the quality of service for different classifications of data. For example, the incoming packet data 155 may first encounter a classifier 160. The classifier 160 may inspect the header of the packet data 155 to identify the proper classification. A marker 165 may write, or rewrite, a portion of the packet header to more clearly identify the determined classification. For example, the marker 165 may write to the Differentiated Service Code Point (DSCP) field of the header.

A meter 170 may track the amount of incoming data 155 processed by the router 140. Moreover, the meter 170 may track the amount of data 155 for each classification. A policer/shaper 175 may use the tracked amounts from the meter 170 to enforce particular traffic routing polices, e.g., quality of service guarantees, service level agreements, etc. To enforce a policy, the policer/shaper 175 may drop packets if the tracked amount of data 155 exceeds the service level agreement. Additionally, the policer/shaper 175 may buffer or delay traffic that fails to conform to policy being enforced. A scheduler 180 has the responsibility of deciding which packets to forward to the cluster 135 for data processing. The scheduler typically bases its decision on the priority levels of the data as well as on the service level agreements. However, the scheduler 180 may be further influenced by the congestion control module 145. In one exemplary approach, the congestion control module 145 may be integrated into the scheduler 180. However, in another exemplary approach, the congestion control module 145 may be distinct from the scheduler 180 while still providing input thereto.

Figure 2A:
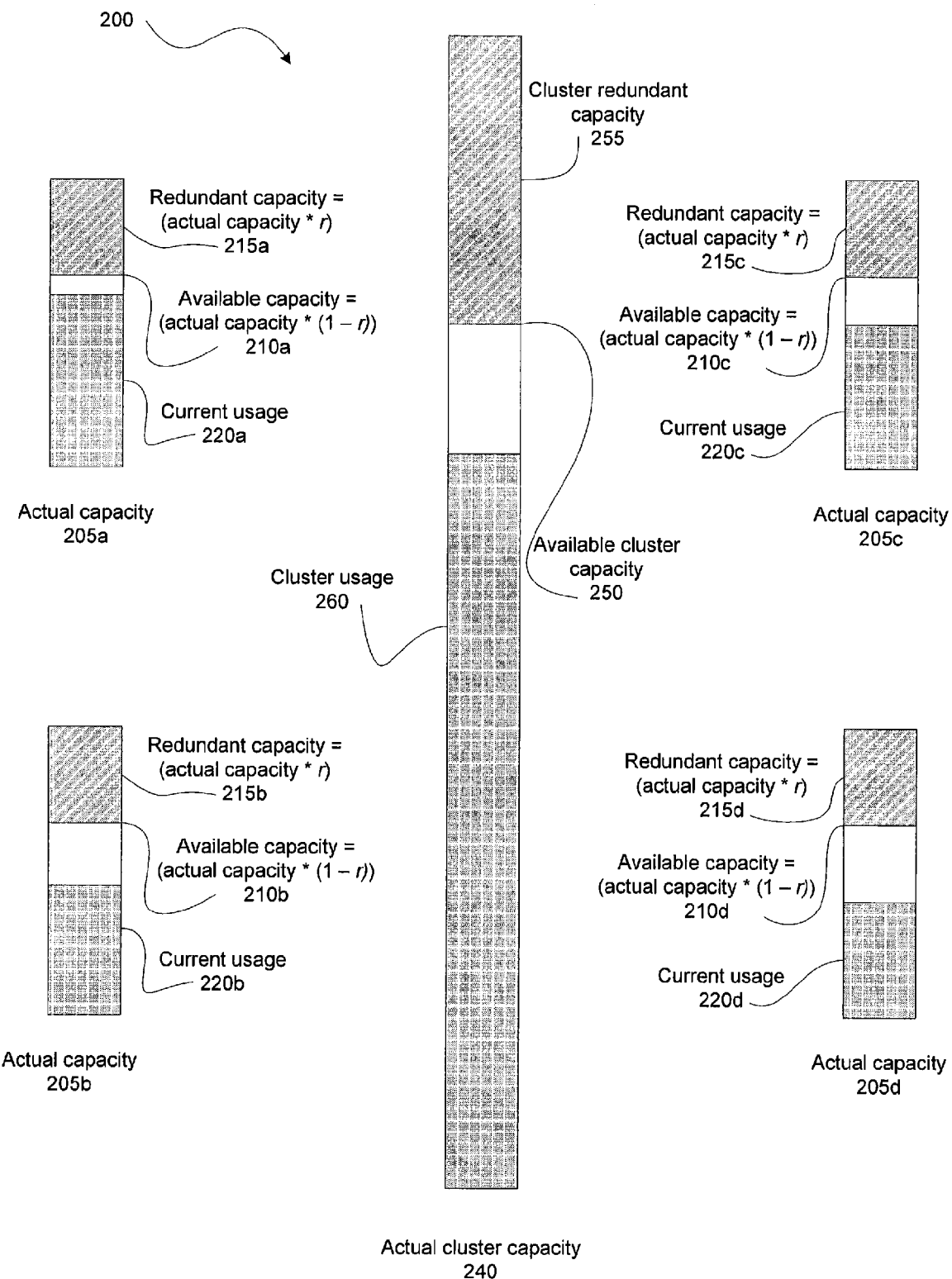
FIG. 2a is a representation of server and cluster capacities.

FIG. 2a illustrates a representation 200 of server and cluster capacities during normal operation. Each server 130 may have an actual capacity 205, which represents the normal or default ability of a server to process data. As depicted, each server 130 has the same actual capacity 205a-d. However, in another exemplary approach, servers 130 with different actual capacities may be part of the same cluster 135.

The actual capacity 205 may be artificially limited or reduced to an available capacity 210. The reduction of the actual capacity 205 provides redundant capacity 215 that is reserved for periods in which there is a server failure. The reduction of the actual capacity 205 of each server 130 may differ. Accordingly, a respective redundancy factor, $r_i$, i=1, 2, . . . , n, where $0 \leq r_i \leq 1$, may be established for each server 130. The redundancy factor $r_i$ states the amount of redundant capacity as a fraction or percentage of the actual capacity 205. Accordingly, the available capacity 210a for each server 130 will be expressed as (Actual Capacity*$(1-r_i)$), while the redundant capacity 215 will be expressed as (Actual Capacity*$r_i$).

If $r_i=0$, it is assumed that the server 130 is expected to have an available capacity 210 equal to the actual capacity 205. Accordingly, any server with a redundancy factor of zero ($r_i=0$) will not provide any redundancy to the cluster 135. On the other hand, if $r_i=1$, then the server will limit its entire actual capacity 205 for redundant capacity 215. Moreover, any server with a redundancy factor of one ($r_i=1$) will not handle any data processing requests unless there has been a failure of another server in the cluster 135. In general, higher redundancy factor values limit larger amounts of actual capacity 205 for redundancy capacity 215.

The available capacity 210 may be used to handle data processing sessions from remote devices. A current usage 220a-d of each server reflects the amount of the available capacity 210 that is currently being used to handle data processing sessions. The current usage 220 will typically fluctuate as the server 130 receives new sessions and completes others. Moreover, the data processing demands on the server 130 may vary throughout a session. The router 140, or equivalent cluster manager, may determine which server 130 should handle newly received packet data. As will be discussed in detail with respect to FIG. 4, a utilization factor may be defined as the ratio of the estimate of current usage 200 over the available capacity 210. In one exemplary approach, the router 140 may implement packet data scheduling decisions by directing incoming traffic to the server meeting at least one threshold criterion. In one illustrative approach the criterion includes a consideration of utilization factor and in another approach the criterion is the lowest utilization factor.

Because the servers 130 act together as a cluster 135, the sum of the actual capacity 205 of each server defines an actual cluster capacity 240. Similarly, the sum of the available capacities 210 of each server defines an available cluster capacity 250. The sum of the redundant capacities 215 of each server defines a cluster redundant capacity 255. The actual cluster capacity 240 will remain constant so long as there are no server failures in the cluster 135. Likewise, the available cluster capacity 250 and the cluster redundant capacity 255 will remain constant so long as there are no changes to the any of the redundancy factors ($r_i$). However, a cluster usage 260 will fluctuate as the sum of the current usage 220 of each server varies.

Figure 2B:
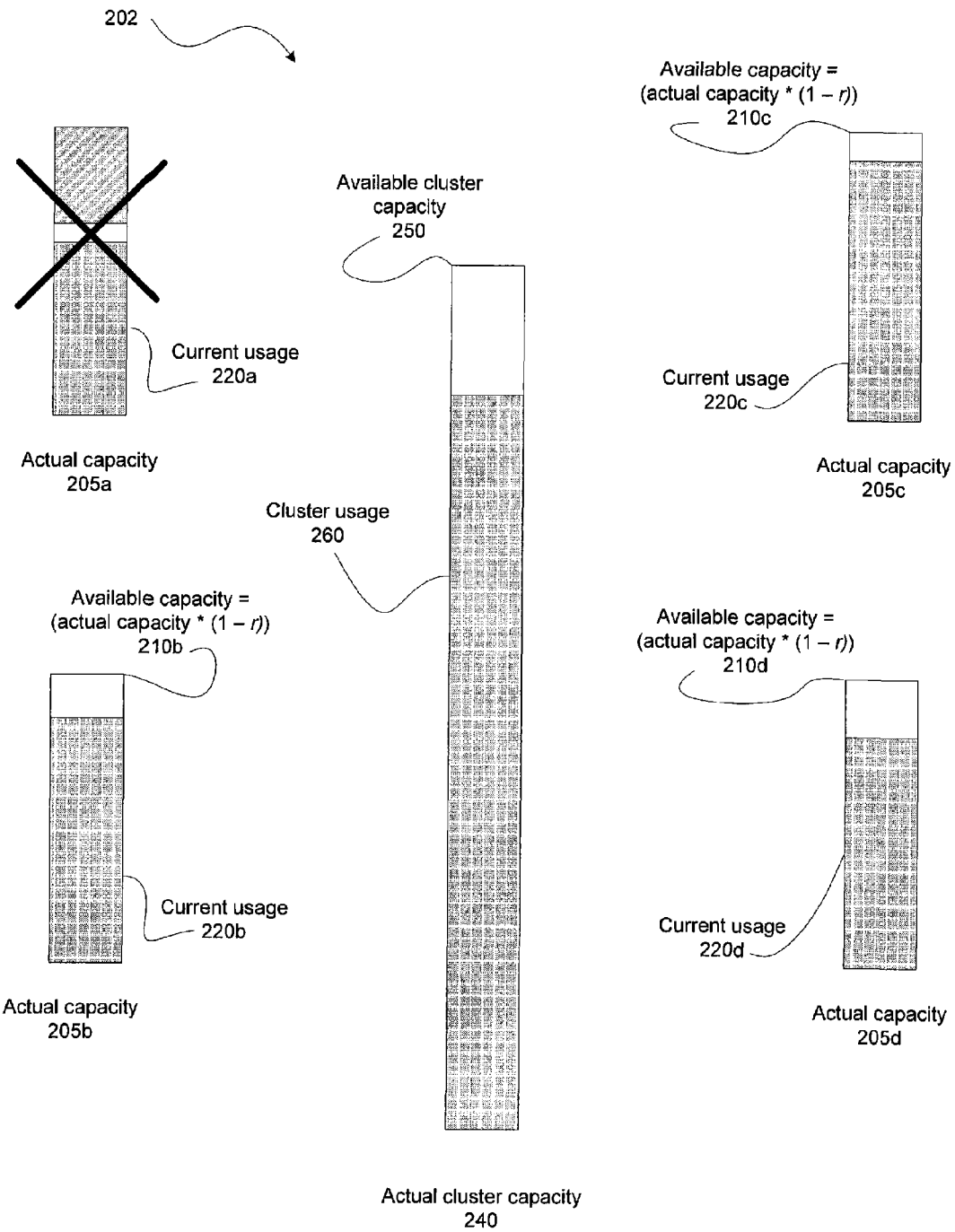
FIG. 2b is a representation of server and cluster capacities in the event of a server failure.

FIG. 2b illustrates a representation 202 of server and cluster capacities during a failure of one of the servers. As indicated by the X, the actual capacity 205a is currently unavailable due to a server failure. Accordingly, the actual cluster capacity 240 is reduced by the actual capacity 205a of the failed server 130. Because of the failure, the redundancy capacity 215 of the remaining servers may be reallocated as available capacity 210. Moreover, the redundant factor of the remaining servers may be set to zero ($r_i=0$) in order to cause the available capacity 210 to fully encompass the actual capacity 205. The current usage 220a of the failed server 130 represents sessions with incomplete or unfinished data processing. Accordingly, the sessions encompassing the current usage 220a may be redistributed to the remaining servers of the cluster 135, thereby increasing the current usage 220b-d levels thereof. As expected, the cluster usage 260 will typically remain unchanged.

The router 140 and servers 130 may be any general purpose computing device, such as a PC, or a specialized network device. The router 140 and servers 130 may have software, such as an operating system with low-level driver software, and the like, for receiving signals over network links. The operating system may also include a network protocol stack, for establishing and accepting network connections from remote devices.

The router 140 and servers 130 may employ any of a number of user-level and embedded operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

The router 140 and servers 130 may include instructions executable by one or more processing elements such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 3:
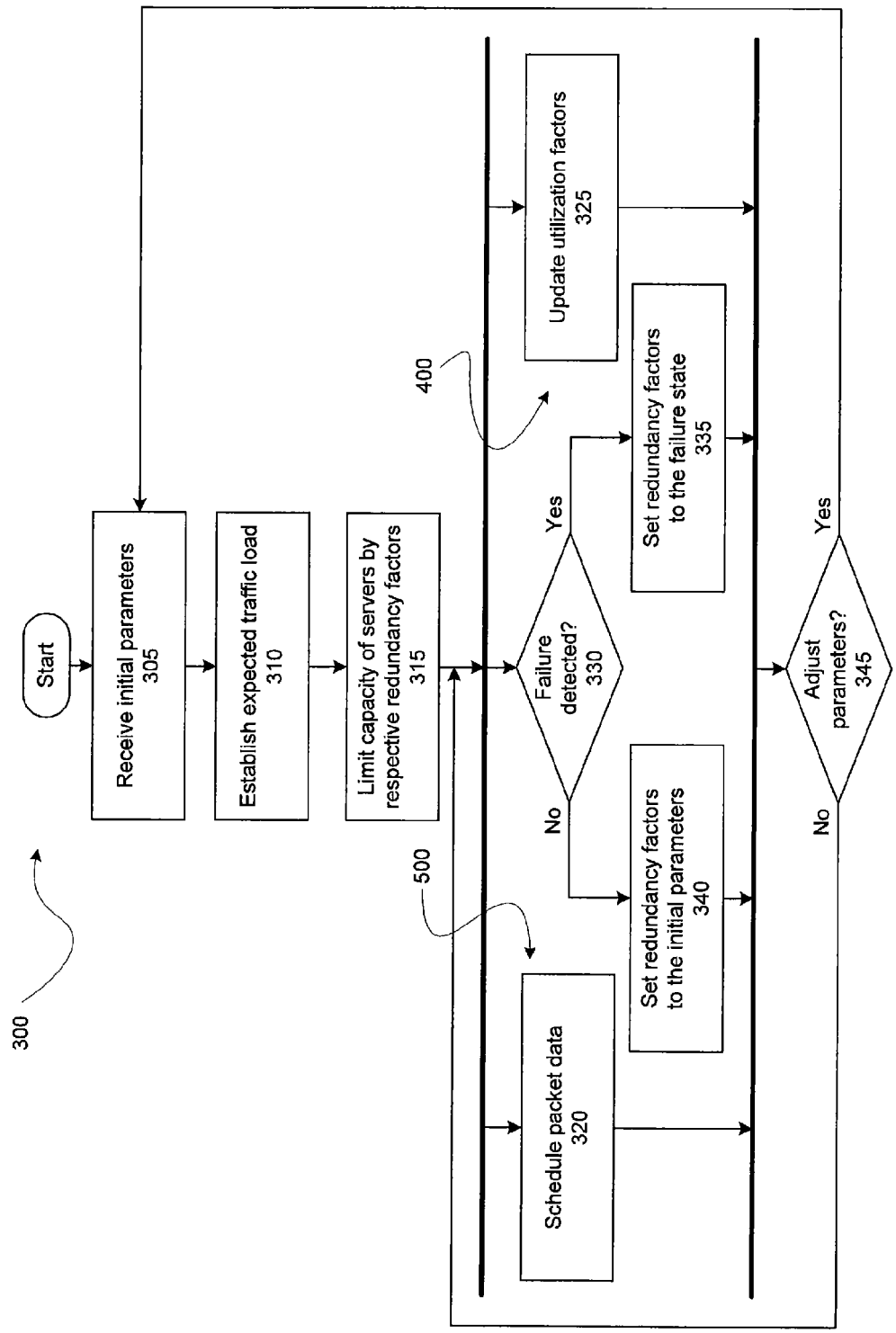
FIG. 3 is a flowchart depicting exemplary steps and decisions related to a process for managing congestion control and server redundancy.

FIGS. 3-5 and the description thereof below present exemplary approaches to the functional details of the congestion control module 145. As illustrated, processes 300, 400 and 500 all operate concurrently. Concurrent operation may allow for the constant monitoring and detection of any failures in the servers 130 of the cluster 135. However, in another exemplary approach, the steps of the processes may be rearranged to operate sequentially. For example, after the initial set-up steps of process 300, process 400 may operate repeatedly for a period of time. Subsequently, process 400 may be paused while the cluster 135 is checked for server failures and process 500 updates the utilization factors.

FIG. 3 illustrates a flowchart of an exemplary process 300 for managing congestion control and server redundancy. The router 140 may include a computer-readable medium having stored instructions for carrying out certain operations described herein, including some or all of the operations described with respect to process 300. For example, some or all of such instructions may be included in the congestion control module 145. As described below, some steps of process 300 may include user input and interactions. However, it is to be understood that fully automated or other types of programmatic techniques may implement steps that include user input.

Process 300 begins in step 305 by receiving initial parameters. The initial parameters include at least the actual capacities 205 and redundancy factors for each of the servers 130. The parameters may be received from user input, e.g., via a command line interface, Graphical User Interface, etc. In another exemplary approach, the parameters may be provided in a configuration file, or the like. Accordingly, the parameters may be received in step 305 by opening the file for reading and extracting the relevant data.

Next, in step 310, an expected traffic load may be established. The expected traffic load may be used to alter or set the redundancy factors of the servers. Historical traffic loads for similar dates and times may be used to establish the expected traffic load. Moreover, the expected traffic load presets a baseline value to be used when initially setting the redundancy factors.

Next, in step 315, the actual capacity 205 of each server may be limited to respective available capacities 210 based on the redundancy factors. In generally, the sum of the available capacities 210, also referred to as the available cluster capacity 250, will correspond to the expected traffic load in order to ensure that all expected traffic will be able to be processed. Moreover, the limiting provides redundant capacity 215 which is reserved for times in which there is a failure of one of the servers 130 of the cluster 135. This initialization step sets baseline values for the available capacities 210. However, in the event of a server failure, the available capacities 210 may be altered by changing the respective redundancy factors.

Following, step 315, steps 320, 325, and 330 may operate concurrently as discussed above. Step 320 includes the steps and decisions of process 500 discussed below. Similarly, step 325 includes the steps and decisions of process 400, also discussed below. Because the utilization factor ($u_{ij}$) is based on the estimated current usage for the given time interval (j), the utilization factor will be calculated at each interval. The process will continue to schedule the data for the given time interval. At the conclusion of a time interval, the process must update the current usage based on the recent traffic load of each server.

In step 330, it is determined whether any of the servers 130 have failed. In one exemplary approach, the router 140 may attempt to contact the servers 130, e.g., by initiate a connection, transmitting a so-called ping (Internet Control Message Protocol echo), etc. In another exemplary approach, the servers 130 may be configured to send out a communication, sometimes referred to as a life beat, to the router 140. No matter the approach, the router 140 will continuously monitor the servers 130 for failures. For example, the lack of a response or the lack of a life beat may be indicative of a server failure.

In step 335, the redundancy factors are set to a failure state if a server failure is detected in step 340. As discussed above, the redundancy factors may be dynamically set to a high values, e.g., one, in order to allocate all of the redundant capacity 215 as available capacity 210.

In step 340, the redundancy factors are set to the initial parameters if a server failure is not detected. In most cases the redundancy factors will already be set to the initial parameters. However, if the functionally of a server 130 has just been restored following a failure, the redundancy factors may need to be changed from the failure state. As discussed above, the redundancy factors may be established such that the available cluster capacity 250 corresponds to the baseline or expected traffic load.

Next, in step 345, the parameters may be adjusted. For example, the redundancy factors may vary based on time and date to correspond with expected traffic loads and the service level that needs to be provided by the cluster 135. For example, if service must be guaranteed to a high degree for a certain time, the redundancy factors may be set to a low level to ensure there is redundant capacity 215 to accommodate any server failures. Accordingly, the parameters may be scheduled for particular times. However, in another exemplary approach, process 300 may be adaptive to current traffic conditions. For example, the parameters may automatically adjust in the face of changing traffic conditions.

If the parameters need to be adjusted, process 300 may return to step 305 to receive the new parameters. However, if no adjustment is required, process 300 may return to concurrent steps 320, 325, and 330.

FIG. 4 illustrates a flowchart of an exemplary process 400 for updating server utilization factors. The router 140 may include a computer-readable medium having stored instructions for carrying out certain operations described herein, including some or all of the operations described with respect to process 400. For example, some or all of such instructions may be included in the congestion control module 145. As discussed above, process 400 may be sub-process for process 300, e.g., in step 325.

Process 400 begins in step 405 by determining the available capacity 210 of each server. In one exemplary approach, the actual capacity 205 and the respective redundancy factor ($r_i$) may be retrieved. For example, these values may be provided as initial parameters via user input, a configuration file, etc. The actual capacity 205 may be multiplied by the redundancy factor ($1-r_i$) to determine the limited available capacity 210.

Next, in step 410, the current usage 220 of each server 130 may be estimated. Unlike the expected traffic load discussed above for setting baseline values for the available capacity, the estimated traffic load attempts to determine the current or actual traffic load. Because it may be too costly to constantly monitor the actual traffic load, e.g., amount of packet data traffic sent to a server 130, the router may break the monitoring into discrete time intervals. In one exemplary approach, the router 140 may monitor the amount of packet data sent to a server every 200 milliseconds. Accordingly, the router 140 only knows historical amounts of packet data traffic sent to a server 130. Moreover, the router may not know the actual amount of traffic sent to a sever during the instant time interval. However, because traffic volumes could potentially change dramatically even during a brief interval, an understanding of the current usage 220 of a server 130 is important for properly balancing the data processing load over the cluster 135. Moreover, the scheduling decision (discussed with respect to FIG. 5) is ideally based on an estimated current usage ($E\lambda_{ij}$) and not on historical usage.

In one exemplary approach, the current usage 220 may be based on a weighted moving average of the actual amounts of usage in prior intervals ($\lambda_{i,j-1}$), ($\lambda_{i,j-2}$), etc. Because the data processing may be based on sessions which exist and draw on server capacity for a period of time, it may be useful to base the current usage on more than just the actual usage of the most recent interval ($\lambda_{i,j-1}$). A weighting factor ($0 \le w \le 1$) may be selected to allocate the weight given to the most recent interval ($\lambda_{i,j-1}$) and the second most recent interval ($\lambda_{i,j-2}$). For example, if it is unusual for a typical session to extend beyond a single interval, the weighting factor (w) may be set to a high value to give more weight the most recent period. Similarly, a lower value of (w) may be selected if it is likely that sessions draw on server capacity 210 for more than one time interval. Accordingly, the estimated current usage ($E\lambda_{ij}$) of each (i) server at each (j) time interval may be represented as $E\lambda_{ij} = w \cdot \lambda_{i,j-1} + (1-w) \cdot \lambda_{i,j-2}$. In other exemplary approaches, formulas that take even more historical values of the actual usage may be appropriate. As will be discussed with respect to FIG. 5, the actual usages for prior time intervals ($\lambda_{i,j-1}$) ($\lambda_{i,j-2}$), etc., may be stored during the packet data scheduling.

Next, in step 415, utilization factors for each server 130 may be calculated. The utilization factor may represent the estimated current usage ($E\lambda_{ij}$) as a ratio to the available capacity 210, where the available capacity is the actual capacity limited by the redundancy factor ($r_i$). In one exemplary approach, the utilization factor ($u_{ij}$) may be expressed as $$\frac{E\lambda_{ij}}{(1-r_i) \cdot ActualCapcity_i}.$$

FIG. 5 illustrates a flowchart of an exemplary process 500 for scheduling packet data traffic to servers in the cluster. The router 140 may include a computer-readable medium having stored instructions for carrying out certain operations described herein, including some or all of the operations described with respect to process 500. For example, some or all of such instructions may be included in the congestion control module 145. As discussed above, process 500 may be sub-process for process 300, e.g., in step 320.

Process 500 begins in step 505 when incoming packet data traffic 155 is received by the router 140. As discussed above with respect to FIG. 2b, the router may classify, meter, mark, and shape the traffic as necessary. Subsequent to these preliminary steps, the scheduler 180, in coordination with the congestion control module 145, may proceed with the following steps to further process and direct the traffic to a particular server 130 of the cluster 135.

Next, in step 510, it is determined whether the received packet data belongs to an existing session. For example, the data may include a session identifier thereby associating the data with a particular session.

In step 515, the packet data will be scheduled to the server 130 that is already handling the session to which the data belongs. The session data from step 510 may be used to determine which server is handling a particular session. While not depicted, process 500 may also store associations between the servers 130 and sessions being processed thereby.

In step 520, following the determination in step 510 that the packet data does not belong to an existing session, the data will be scheduled to one of the servers 130 of the cluster 135. As discussed above with respect to process 400, utilization factors may be maintained and updated for each server. The utilization factors express the estimated usage of the server 130 with respect to the available capacity 210. The server with the highest utilization factor has the least amount of unused available capacity 210. To effectively balance the traffic load between the servers 130 of the cluster 135, the new traffic may be scheduled to the server 130 having the lowest utilization factor.

Following both steps 515 and 520, the record of the amount of packet data traffic sent to the server 130 may be updated in step 525. The router 140, or cluster manager, may keep historical records of the amounts of traffic sent to each server, e.g., a record for each of the last five time intervals. As discussed above, a time interval, e.g., 200 ms, may be defined for breaking down the calculation of the utilization factors. The historical records may be in the form of a circular list, or equivalent data structure, with an index value, e.g., 0-4, used to identify the record associated with the current time interval. Accordingly, the amount of the traffic scheduled to the server in either step 515 or step 520 will be added to the record associate with the server and the current time interval. While in another exemplary approach, the servers 130 could report back their actual current usage rates, monitoring estimated usage rates by the router 140 may eliminate time consuming bi-directional communication required for such reporting.

Accordingly, an exemplary congestion control method for session based network traffic has been described. Session handling servers 130 arranged in a cluster 135 may receive packet data traffic 155 from an upstream network device such as a router 140. The actual traffic handling capacity 205 of each server 130 may be limited by a redundancy factor ($r_i$) to respective available capacities 210 in order to provide redundancy capacity 215. The redundancy factors ($r_i$) may be altered dynamically in order to provide more or less redundancy in the cluster 135. For example, the redundancy factors ($r_i$) may be decreased during times in which service availability is critically important. At other times, the redundancy factors may be increased to provide more available processing capacity 210, which may be useful in the event of a failure of one of the servers 130. To balance the traffic load across the cluster 135, the amount of data traffic sent to each server may be tracked and recorded for a number of historical time intervals. Some or all of the historical records may be used to estimate a current usage ($E\lambda_{ij}$). Newly received traffic that is not associated with an existing session may be scheduled to the server having the lowest utilization factor ($u_{ij}$), e.g., the ratio of the estimated usage to the available capacity.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method, comprising:
    establishing an expected traffic load to be processed by a plurality of servers, each server having an actual capacity for processing a traffic load portion of the expected traffic load, a pre-established redundancy factor, and a failure state redundancy factor;
    reserving a combined redundant capacity across the plurality of servers by utilizing each pre-established redundancy factor particular to each server to:
        allocate a portion of the actual capacity of each server to a respective redundant capacity that is unavailable to that server for processing the traffic load portion, and
        allocate a remaining portion of the actual capacity of each server to an available capacity,
        wherein each available capacity aggregates to a combined available capacity across the plurality of servers that corresponds to the expected traffic load; and
    when at least one of the plurality of servers fails:
        dynamically altering each available capacity of each server of the plurality of servers that remains active by utilizing each pre-established redundancy factor particular to each server to an altered available capacity, wherein the altered available capacity uses at least a portion of the respective redundant capacity to continue to process the expected traffic load despite a loss of the actual capacity of the at least one of the plurality of servers that failed, and
    reserving a subsequent combined redundant capacity across each server of the plurality of servers that remains active by utilizing each failure state redundancy factor.

2. The method of claim 1, further comprising:
    for each server:
        calculating a utilization factor for the server; and
        scheduling traffic to the server according to at least one criterion including a consideration of the utilization factor.

3. The method of claim 2, further comprising basing the utilization factor of each server on a current usage for the server and the available capacity for the server.

4. The method of claim 3, further comprising estimating the current usage for each server according to previous amounts of traffic scheduled thereto.

5. The method of claim 4, further comprising determining the current usage based on a weighted average of the previous amounts of traffic as reported by an upstream network device.

6. The method of claim 1, further comprising determining the expected traffic load based on historical traffic loads for at least one of a similar date and a similar time of day.

7. The method of claim 1, wherein each pre-established redundancy factor is a value that varies with respect to a time and date of the failure and the expected traffic load during that time and date.

8. The method of claim 1, wherein each failure state redundancy factor particular to each server is greater than the pre-established redundancy factor particular to that server.

9. The method of claim 1, wherein the expected traffic load is a baseline amount of data traffic transferred to and from the plurality of servers.

10. The method of claim 1, wherein the available capacity of each server is less than the actual capacity of that server.

11. The method of claim 1, wherein each respective redundant capacity aggregates to the combined redundant capacity across the plurality of servers.

12. A method, comprising:
receiving packet data traffic bound for a cluster including a plurality of session handling servers at an upstream network device, each session handling server having an actual capacity for processing a packet data traffic load, a pre-established redundancy factor, and a failure state redundancy factor;
reserving a combined redundant capacity across the plurality of session handling servers by utilizing each pre-established redundancy factor particular to each session handling server to:
allocate a portion of the actual capacity of each session handling server to a respective redundant capacity that is unavailable to that session handling server for processing the traffic load portion, and
allocate a remaining portion of the actual capacity of each session handling server to an available capacity, wherein each available capacity aggregates to a combined available capacity across the plurality of session handling servers that corresponds to the expected traffic load;
directing the packet data traffic to one of an existing session being processed the by one of the session handling servers and a new session to be processed the by the one of the session handling servers having the lowest utilization factor of available capacity;
monitoring the cluster for a failure of one of the session handling servers; and
when the monitoring detects that at least one of the plurality of session handling servers fails:
dynamically altering each available capacity of each session handling server of the plurality of session handling servers that remains active by utilizing each pre-established redundancy factor particular to each session handling server to an altered available capacity, wherein the altered available capacity uses at least a portion of the respective redundant capacity to continue to process an expected traffic load upon the failure of one of the session handling servers, and
reserving a subsequent combined redundant capacity across each session handling server of the plurality of session handling servers that remains active by utilizing each failure state redundancy factor.

13. The method of claim 12, further comprising:
establishing the expected traffic load for the cluster, and
wherein the cluster has a combined actual traffic capacity based on the actual capacities of each server.

14. The method of claim 12, further comprising basing the utilization factor of each server on at least an estimating of a current usage for the server and the available capacity for the server.

15. The method of claim 14, wherein the estimate of the current usage for each server includes reviewing previous amounts of traffic scheduled thereto.

16. The method of claim 15, further comprising determining the current usage based on a weighted average of the previous amounts of traffic as reported by the upstream network device.

17. A system, comprising:
a plurality of session handling servers forming a cluster, each session handling server having a respective actual capacity for processing a packet data traffic load, a pre-established redundancy factor, and a failure state redundancy factor; and
an upstream network device having a scheduler communicatively coupled to the cluster, wherein the scheduler includes instructions configured to control the network device to:
reserve a combined redundant capacity across the plurality of session handling servers by utilizing each pre-established redundancy factor particular to each session handling server to:
allocate a portion of the actual capacity of each session handling server to a respective redundant capacity that is unavailable to that session handling server for processing the traffic load portion, and
allocate a remaining portion of the actual capacity of each session handling server to an available capacity,
wherein each available capacity aggregates to a combined available capacity across the plurality of session handling servers that corresponds to the expected traffic load;
receive packet data traffic from remote network devices;
direct the packet data traffic to one of an existing session being processed the by one of the session handling servers and a new session to be processed the by the one of the plurality of session handling servers having a utilization factor meeting at least one threshold criteria of available capacity;
monitor the cluster for a failure of one of the session handling servers; and
when the monitoring detects that at least one of the plurality of session handling servers fails:
dynamically alter each available capacity of each session handling server of the plurality of session handling servers that remains active by utilizing each pre-established redundancy factor particular to each session handling server to an altered available capacity, wherein the altered available capacity uses at least a portion of the respective redundant capacity to continue to process an expected traffic load upon the failure of one of the session handling servers, and
reserving a subsequent combined redundant capacity across each session handling server of the plurality of session handling servers that remains active by utilizing each failure state redundancy factor.

18. The system of claim 17, further comprising additional instructions configured to control the network device to:
establish the expected traffic load for the cluster, and
wherein the cluster has a combined actual traffic capacity based on the actual capacities of each server.

19. The system of claim 17, further comprising additional instructions configured to control the network device to base the utilization factor of each server on a current usage for the server and the available capacity for the server.

20. The system of claim 19, further comprising additional instructions configured to control the network device to:
estimate the current usage for each server according to previous amounts of traffic scheduled thereto, and
determine the current usage based on a weighted average of the previous amounts of traffic tracked by the device.

* * * * *